US012580996B2

(12) United States Patent
Sooji et al.

(10) Patent No.: US 12,580,996 B2
(45) Date of Patent: Mar. 17, 2026

(54) SYSTEMS, METHODS, AND MEDIA FOR PREDICTING DATA FOR PRECACHING AND/OR RECACHING AT A COMPUTER CACHE OF A COMPUTER ENVIRONMENT

(71) Applicant: FMR LLC, Boston, MA (US)

(72) Inventors: Krishnaraj Sooji, Bengaluru (IN); Ashok Rajashekharappa, Bangalore (IN); Prabhu Karthik Ganesan, Bengaluru (IN); Umesh Bangalore Rangappa, Bangaluru (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/668,600

(22) Filed: May 20, 2024

(65) Prior Publication Data

US 2025/0358345 A1 Nov. 20, 2025

(51) Int. Cl.

| | |
|---|---|
| *H04L 67/5681* | (2022.01) |
| *G06F 12/0862* | (2016.01) |
| *G06F 16/957* | (2019.01) |
| *H04L 67/1001* | (2022.01) |
| *H04L 67/1036* | (2022.01) |
| *H04L 67/568* | (2022.01) |

(52) U.S. Cl.
CPC ...... *H04L 67/5681* (2022.05); *G06F 12/0862* (2013.01); *G06F 16/9574* (2019.01); *H04L 67/1001* (2022.05); *H04L 67/10015* (2022.05); *H04L 67/1036* (2013.01); *H04L 67/568* (2022.05); *G06F 2212/6024* (2013.01); *G06F 2212/6026* (2013.01)

(58) Field of Classification Search
CPC ........... G06F 12/0862; G06F 2212/602; G06F 2212/6024; G06F 2212/6026; H04L 67/5681; H04L 67/02; H04L 67/568; H04L 67/10015; H04L 67/1036; H04L 67/1001
See application file for complete search history.

(56) References Cited

U.S. PATENT DOCUMENTS

| | | | | |
|---|---|---|---|---|
| 10,574,699 | B1 * | 2/2020 | Baer | G06F 21/6218 |
| 11,917,013 | B1 * | 2/2024 | Han | H04L 12/66 |
| 11,997,574 | B2 * | 5/2024 | Paczkowski | H04L 41/16 |
| 12,061,553 | B1 * | 8/2024 | Bhattacharjee | G06F 12/0862 |
| 2009/0157678 | A1 * | 6/2009 | Turk | G06F 16/24552 |

(Continued)

*Primary Examiner* — Gregory Todd
(74) *Attorney, Agent, or Firm* — Cesari and McKenna, LLP

(57) ABSTRACT

Techniques are provided for predicting data for precaching and/or recaching at a computer cache of a computer environment. Based on a detected login event of a user, a precache API request can be generated for a type of API data request most often utilized by the user over a predetermined time period. An API gateway may use the precache API request to obtain a corresponding precache API response from a microservice. The precache API response may be stored together at an API gateway cache. Subsequently, when information from an API call substantially matches a cache key corresponding to the precache API response, the precache API response can be provided to the user instead of obtaining the response from the microservice. Additionally, the precache API request may include a recache value that can be used to iteratively obtain up-to-date precache API responses from the microservice.

14 Claims, 8 Drawing Sheets

| | API INFORMATION | HEADER | RECACHE VALUE |
|---|---|---|---|
| 401A | customer-history-account-balance | "Request_method":"G ET","user_id" :John Doe", "protocol":"HTTP/1.1" | 5 |
| 401B | client-relationship-beneficiary-information | "Request_method":"GET","user_id":JohnDoe", "protocol":"HTTP/1.1 | 0 |
| 401C | marketing-campaign-edeilivery- Q1-2024 | "Request_method":"GET","user_id" :John Doe", "protocol":"HTTP/1.1" | 3 |

(56)  References Cited

U.S. PATENT DOCUMENTS

| | | | | |
|---|---|---|---|---|
| 2009/0204753 A1* | 8/2009 | Bridge, Jr. | ............ | G06F 12/123 |
| | | | | 711/E12.001 |
| 2019/0141160 A1* | 5/2019 | Demsey | ............. | H04L 43/0876 |
| 2019/0243766 A1* | 8/2019 | Doerner | ............. | G06F 12/0862 |
| 2021/0006496 A1* | 1/2021 | Xiong | ................... | G06F 9/547 |
| 2021/0036925 A1* | 2/2021 | Boddam | ............ | H04L 41/0286 |
| 2021/0042160 A1* | 2/2021 | Alamouti | ............. | H04L 67/565 |
| 2021/0209024 A1* | 7/2021 | Liang | ................. | G06F 12/0868 |
| 2022/0035741 A1* | 2/2022 | Ray | .................... | G06F 12/0813 |
| 2023/0018767 A1* | 1/2023 | Singh | ................... | H04L 63/068 |
| 2023/0259415 A1* | 8/2023 | Kairali | ................... | G06F 9/547 |
| | | | | 719/328 |
| 2023/0359520 A1* | 11/2023 | Edamadaka | ............ | H04L 67/10 |
| 2024/0256364 A1* | 8/2024 | Ward | ................. | G06F 11/0793 |

\* cited by examiner

Figures 3A, 3B:
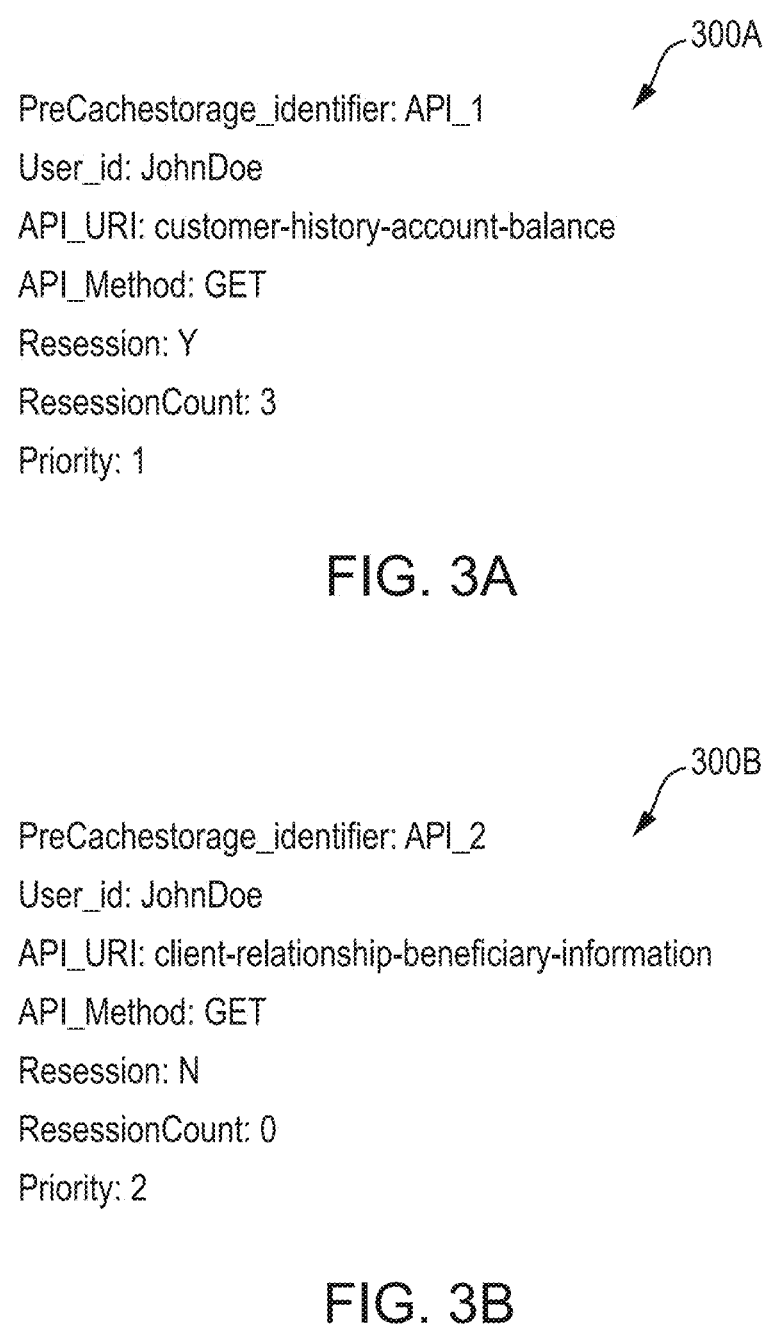

300A

PreCachestorage_identifier: API_1

User_id: JohnDoe

API_URI: customer-history-account-balance

API_Method: GET

Resession: Y

ResessionCount: 3

Priority: 1

PreCachestorage_identifier: API_2

User_id: JohnDoe

API_URI: client-relationship-beneficiary-information

API_Method: GET

Resession: N

ResessionCount: 0

Priority: 2

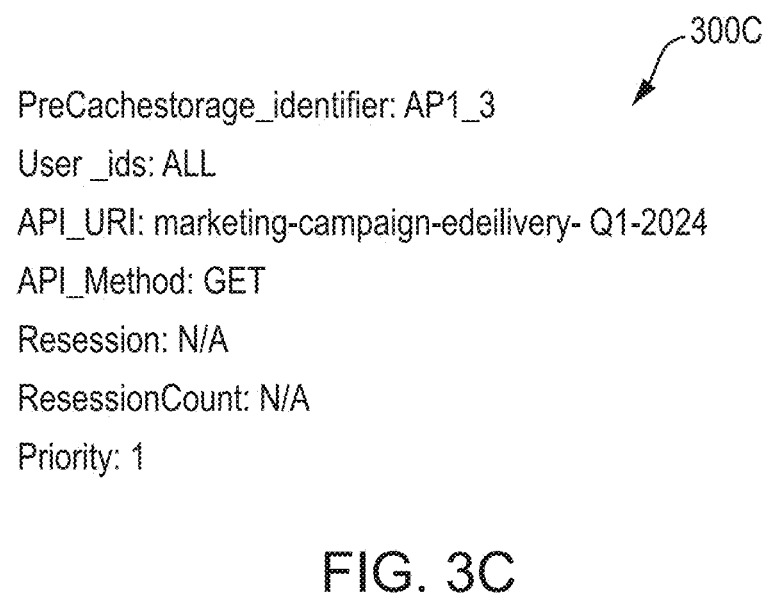

PreCachestorage_identifier: AP1_3

User _ids: ALL

API_URI: marketing-campaign-edeilivery- Q1-2024

API_Method: GET

Resession: N/A

ResessionCount: N/A

Priority: 1

FIG. 3C

| API INFORMATION | HEADER | RECACHE VALUE |
|---|---|---|
| customer-history-account-balance | "Request_method":"G ET","user_id" :"John Doe", "protocol":"HTTP/1.1" | 5 |
| client-relationship-beneficiary-information | "Request_method":"GET","user_id":"JohnDoe", "protocol":"HTTP/1.1 | 0 |
| marketing-campaign-edelivery- Q1-2024 | "Request_method":"GET" ,"user_id" :"John Doe", "protocol":"HTTP/1.1" | 3 |

SYSTEMS, METHODS, AND MEDIA FOR PREDICTING DATA FOR PRECACHING AND/OR RECACHING AT A COMPUTER CACHE OF A COMPUTER ENVIRONMENT

BACKGROUND

Technical Field

The present disclosure relates generally to computer environments, and more specifically to techniques for predicting data for precaching and/or recaching at a computer cache of a computer environment.

Background Information

An existing computing paradigm involves users accessing data stored at a remote enterprise's computer system through client devices like PCs and mobile phones via a computer network. This approach allows users to interact with enterprise resources regardless of their physical locations, enabling flexibility and remote access capabilities. However, there are challenges in such remote computing environments. Such challenges may include, but are not limited to, network latency, system instability, flaky response, synchronization issues, software bugs, data inconsistency, etc.

These described challenges, when encountered, can result in client devices attempting to access data from the enterprise system over the network and receiving incorrect data, stale data, or even no data at all (hereinafter collectively referred to as problematic data). For example, network latency can delay data retrieval at the client device, thereby causing users to receive stale data. Therefore, the seamless retrieval of up-to-date and accurate data at client devices can be hindered and the user experience and operational efficiency can be negatively impacted in such remote computing environments.

A microservices architecture can exacerbate these problems by introducing additional complexities. With a microservices architecture, an application can be divided into smaller and independently deployable microservices, each of which may implement a specific function for the application. While a microservices architecture enhances scalability, maintenance, and updating, it also introduces challenges in relation to data retrieval. For example, microservices often communicate via network application programming interface (API) calls, which increases the potential for latency and network-related issues. This in turn can cause client devices to receive problematic data instead of up-to-date and accurate data in the computing environment that utilizes a microservices architecture.

Therefore, what is needed is a technique that increases the likelihood that client devices receive, from a remote computing environment, up-to-date and accurate data instead of problematic data.

SUMMARY

Techniques are provided for predicting data for precaching and/or recaching at a computer cache of a computer environment. Specifically, records for API calls may be analyzed to identify the types of API data request calls most often used by each of a plurality of users over a predefined time period. The types of most often used API data request calls may be indicative of, e.g., a predictor of, the type of API data request calls most likely to be used by users in the future. API requests can be constructed for the types of API data request calls most often used by each user. The API responses that corresponds to the constructed user specific API request can be cached and/or recached at an API gateway cache. Advantageously, cached responses for data requests can be efficiently provided to client devices operated by users instead of having to obtain the responses from microservices.

In an embodiment, a processor (e.g., a software module executed by a processor) may analyze records of API calls made by a plurality of different users that are interacting with an enterprise system over a predefined time period (e.g., 24 hours). Based on the analysis, the processor may identify one or more types of API data request calls for each user. Specifically, the processor may identify one or more types of API data request calls most often utilized by each user over the predefined time period. For example, the processor may identify the 6 types of API data request calls most often used by a specific user over the past 24 hours. The one or more types of API data request calls most utilized by a user over the predefined time period may be indicative of, e.g., a predictor of, the types of API data request calls to be utilized by the user in the future. Therefore, the one or more embodiments as described herein may cache (i.e., caching is only enabled for) specific types of API data requests that are identified for specific users. As a result, cache space is optimized for use by those identified API data request calls corresponding to specific users instead of all API data requests calls for all users.

For each identified type of API data request call for each user, the processor may construct a precache API entry for storage in precache storage. In addition or alternatively, one or more system defined API entries may be constructed for storage in precache storage at an API gateway, for example.

Subsequently, the API gateway may detect a login event for a user at the enterprise system. The processor may identify one or more precache API entries from precache storage that correspond to the user. For each identified precache API entry, the processor may construct a precache API request mimicking a user. In an embodiment, each constructed precache API request includes a header, API identifier information, and a recache value. The header may include a bearer token based on authorization of a user and a user identifier of the user. In an embodiment, the header may include a customized standard header when invoking an API.

The API gateway may issue the precache API request to a microservice of a plurality of different microservices of the enterprise system to obtain a precache API response. The precache API request may be iteratively issued to different instances of the microservice until the precache API response is acceptable or a threshold number of precache API requests have been issued.

When the precache API response is acceptable, the precache API response can be stored at the API gateway cache. As such, and when the user issues an API call and the API call substantially matches a cache key for a precache API response stored at the API gateway cache, the precache API response can be provided to the user instead of having to obtain the response from the microservice.

When a precache API request includes one or more particular recache values, the corresponding precache API response may be designated for recaching before expiry of a time-to-live (TTL) for cached data. When a precache API response is designated for recaching, the corresponding precache API request may be reissued to instances of a particular microservice at a predefined time interval and a particular number of times such that a most up-to-date precache API response is cached. When a new precache API response is obtained based on the recaching, the new precache API response can take the place of the previously stored precache API response at the API gateway cache.

BRIEF DESCRIPTION OF THE DRA WINGS

The description below refers to the accompanying drawings, of which:

FIGS. 3A and 3B are example precache API entries that are constructed from API data request calls corresponding to a user according to the one or more embodiments as described herein;

FIG. 3C is an example of a system defined API entry that is constructed for users according to the one or more embodiments as described herein;

FIG. 4 are examples of precache API requests that are constructed for precache API entries and system defined API entry of FIGS. 3A-3C according to the one or more embodiments as described herein;

DETAILED DESCRIPTION OF AN ILLUSTRATIVE EMBODIMENT

Figure 1:
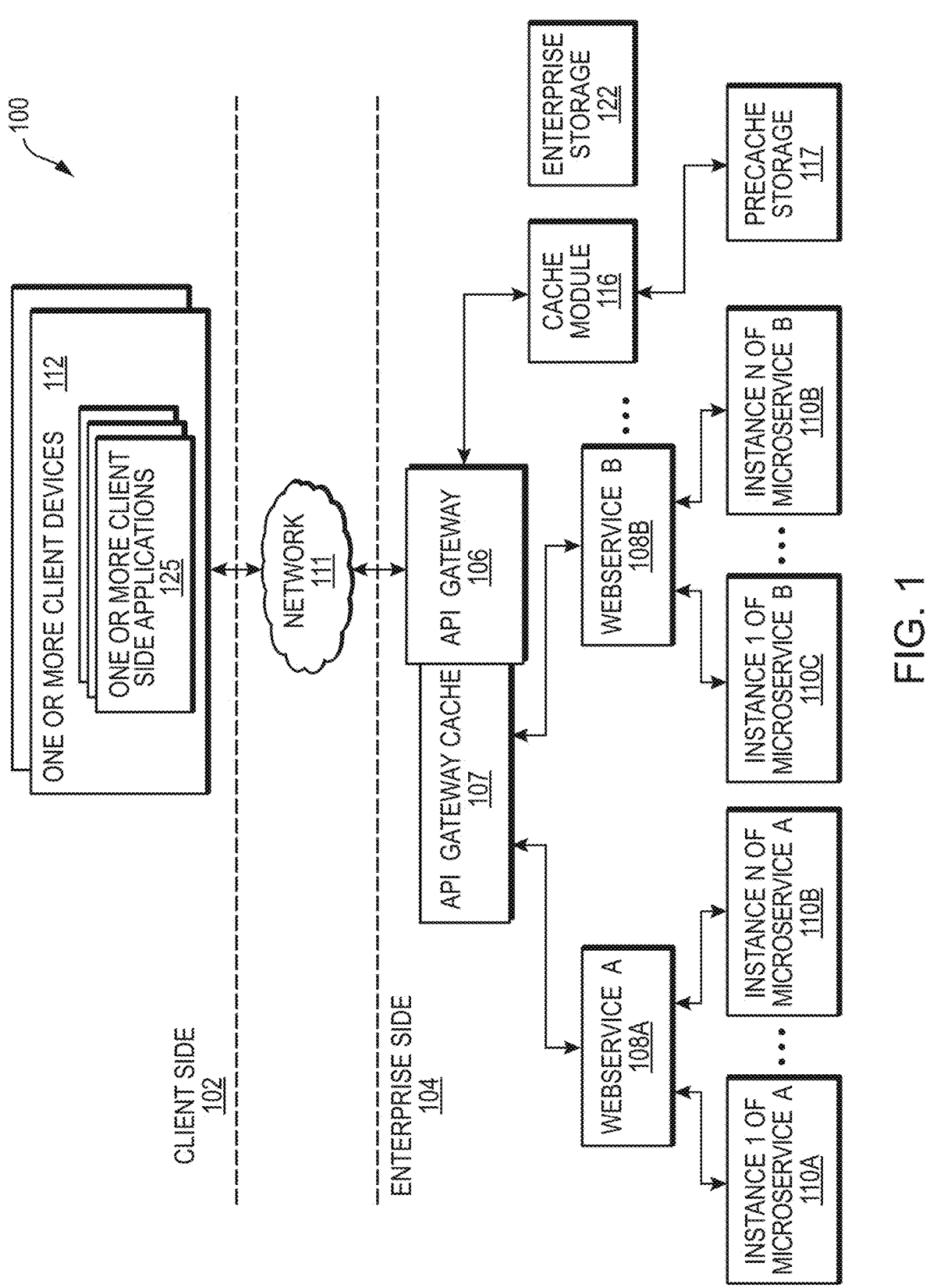
FIG. 1 is a high-level block diagram of an example system architecture for predicting data for precaching and/or recaching at a computer cache of a computer environment.

FIG. 1 is a high-level block diagram of an example system architecture 100 for predicting data for precaching and/or recaching at a computer cache of a computer environment. The system architecture 100 may be divided into a client side 102 that includes one or more local client devices 110 that are local to end users, and enterprise side 104 that is remote to the end users.

The client side 102 may include one or more local client devices 112. According to the one or more embodiments as described herein, each client device 112 may include processors, memory, a display screen, and/or other hardware (not shown) for executing software, storing data, and/or displaying information. The one or more client devices 112 may provide a variety of user interfaces and non-processing intensive functions.

For example, client device 112 may provide a user interface for receiving user input and displaying output according to the one or more embodiments as described herein. The user interface can be a graphical user interface or a command line interface. In an embodiment, the client device 112 may be a server, a workstation, a platform, a mobile device, a network host, or any other type of computing device.

The client device 112 may be operated by affiliates of an enterprise. In an embodiment, the enterprise is a financial services institution. The affiliates may include employees and/or customers of the enterprise. The client device 112 may communicate with enterprise side 104 over network 111. For example, and as will be described in further detail below, client device 112 may request data hosted on the enterprise side 104 using one or more client side applications 125 that, for example, may be web-based applications. Based on the request, and as will be described in further detail below, the enterprise side 104 may transmit response data to client device 112 operated by users. In an embodiment, client device 112 may access the enterprise side 104 using a web-based dashboard, command-line interface (CLI), an application programming interface (API), etc.

Enterprise side 104 may be managed, operated, and maintained by an enterprise. In an embodiment, the enterprise of enterprise side 104 may be a financial services institution. It is expressly contemplated that the one or more embodiments as described herein are applicable to any of a variety of different types of enterprise systems that may be managed, operated, and/or maintained by any of a variety of different types of enterprises that may provide any types of services. As such, the reference herein to a financial services institution that provides financial services functions is for illustrative purposes only. Further, enterprise side 104 may be referred to as a computing/computer environment or a remote computing/computer environment according to the one or more embodiments as described herein.

The enterprise side 104 may include an API gateway 106. API gateway 106 may act as a single-entry to enterprise side 104 by client devices 110. In an embodiment, the API gateway 106 may map and forward requests issued by client devices 110 to instances of different microservices 110 via webservices 108. API gateway 106 may include an API gateway cache 107. According to the one or more embodiments as described herein, and as will be described in further detail below, API gateway cache 107 may store precache API requests and corresponding precache API responses based on predicted paths of users and/or system defined criteria. If an API call received by client device 112 substantially matches a precache API request stored in API gateway cache 107, the corresponding precache API response from API gateway 106 may be transmitted to client device 112.

The instances of the microservices 110 of FIG. 1 together may be referred to as a microservices architecture. In an embodiment, an instance of a microservice 110 may be a virtual device, e.g., virtual service, which executes an instance of a particular microservice. For example, and as depicted in FIG. 1, there may be a plurality of different instances of microservice A, which are indicated in FIG. 1 using ellipsis between instance 1 of microservice A 110A and instance N of microservice A 110B. Similarly, there may be a plurality of different instances of microservice B, which are indicated in FIG. 1 using ellipsis between instance 1 of microservice B 110C and instance N of microservice B 110D. For simplicity and ease of understanding, FIG. 1 only includes two microservices, microservices A and B. However, it is expressly contemplated that enterprise side 104 may include many more microservices, each of which may execute on a plurality of different instances, e.g., virtual servers.

Webservices 108 may act as an intermediary between the API gateway 106 and the instances of the microservices 110. Each webservice 108 may, for example, act as an interface and forward requests to an appropriate instance of a microservice. For simplicity and ease of understanding, FIG. 1 only includes webservice A 108A for microservice A and webservice B 108A for microservice B. However, it is expressly contemplated that enterprise side 104 may include many more webservices. In an embodiment, there may be a different webservice 108 for a plurality of different instances of a microservice.

Enterprise side 104 includes enterprise storage 122 that may store one or more objects, data structures, etc. that may be generated or utilized according to the one or more embodiments as described herein. In an embodiment, enterprise storage 122 may store one or more API records for the API calls made by client device 112 to enterprise side 104. In an embodiment, the API records may be logs that are maintained at API gateway 106 based on the API calls from client device 112. In an embodiment, the API gateway 106 may perform a dump of the API records, e.g., logs, to enterprise storage 122 on a predetermined schedule. For example, the API gateway 106 may perform a dump of the API records, e.g., logs, every day, every 12 hours, etc. In an embodiment, enterprise storage 122 may be one or more of (1) one or more databases (e.g., relational databases), hard disk drives (HDDs), and/or solid state drives (SSDs).

Enterprise side 104 may also include cache module 116 that, with API gateway 106, may implement the one or more embodiments as described herein. Specifically, and as will be described in further detail below, the cache module 116 may analyze records of API calls made by a plurality of different users that interact with enterprise side 104 over a predefined time period (e.g., past 24 hours). The records may be maintained at API gateway 106 and/or enterprise storage 122. Based on the analysis, the cache module 116 may identify one or more types of API data request calls for each user. For example, the cache module 116 may identify one or more types of API data request calls most often utilized by each user over the predefined time period. The one or more types of API data request calls most utilized by a user over the predefined time period may be indicative of the types of API data request calls to be utilized by the user in the future. The cache module 116 may construct, i.e., generate, a precache API entry for each type of API data request call identified for each user. The constructed precache API entries may be stored at precache storage 117. In an embodiment, the precache storage 117 is a database.

Based on a detected login event from a user, the cache module 116 may identify entries from precache storage 117 that correspond to the user and construct a precache API request for each identified entry. The precache API requests may then be transmitted to API gateway 106. API gateway 106 may use a precache API request to obtain a corresponding precache API response, which is specific to the user, from a microservice 110. The precache API response may be stored at API gateway cache 107. As such, and when the user issues an API call that substantially matches a cache key corresponding to a stored precache API response, the precache API response stored in API gateway cache 107 can be transmitted to the client device 112 operated by the user without having to obtain an API response from a corresponding microservice 110 by way of a webservice 108.

Therefore, the enterprise side 104 operates more efficiently and with less latency when compared to conventional computing environments that do not operate a computer cache, e.g., API gateway cache 107, according to the one or more embodiments as described herein. For example, and with conventional systems that do not cache API responses in the manner described herein, API responses need to be obtained from the appropriate microservice 110 via a webservice 108 at the time of the request.

As an example, consider a user operating client device 112 that executes client side application 125 for financial services. The user may utilize the client side application 125 to request account balance information of the user's checking account. Because conventional systems do not cache API responses as described herein, the request for the user's account balance information would require obtaining the user's account balance information, in the form of an API response, from a particular microservice 110 via a webservice 108. Obtaining the user's account balance information from a particular microservice 110 at the time of the request, as required by conventional systems, introduces latency that can result in the user seeing the incorrect account balance, an old account balance, or no data on the client side application 125 until the API response is provided to client device 112.

The one or more embodiments as described herein overcome this inefficiency and introduced latency by caching, when a login event is detected, API responses at API gateway cache 107 in the manner described herein. Therefore, the user's account balance information (e.g., precache API response) can be obtained from the API gateway cache 107 at the time of the request instead of having to obtain the requested data from a microservice 110 via a webservice 108. Because the requested data can be obtained from API gateway cache 107 at the time of the request, the user is less likely to see problematic data and instead can immediately see up-to-date and accurate account balance information. As such, the one or more embodiments as described herein provide an improvement in the technological field of cache computing. Further, network bandwidth is preserved since communication with the microservices 110 can be foregone when the API responses are stored at API gateway cache 107 according to the one or more embodiments as described herein. Therefore, the one or more embodiments as described herein provide an improvement to the computer, e.g., computing devices operating on enterprise side 104, itself.

In addition to precaching API responses, cache module 116, with API gateway 106, may also perform recaching as described herein. Specifically, and as will be described in further detail below, cache module 116 with API gateway 106 may replace particular precache API responses at API gateway cache 107 with newer precache API responses at predefined time intervals. As such, users can obtain the most up-to-date data from API gateway cache 107 without obtaining the data from microservices 110. As such, the recaching as described herein provides an improvement to the computer itself and also provides an improvement in the technological field of cache computing.

Figure 2A:
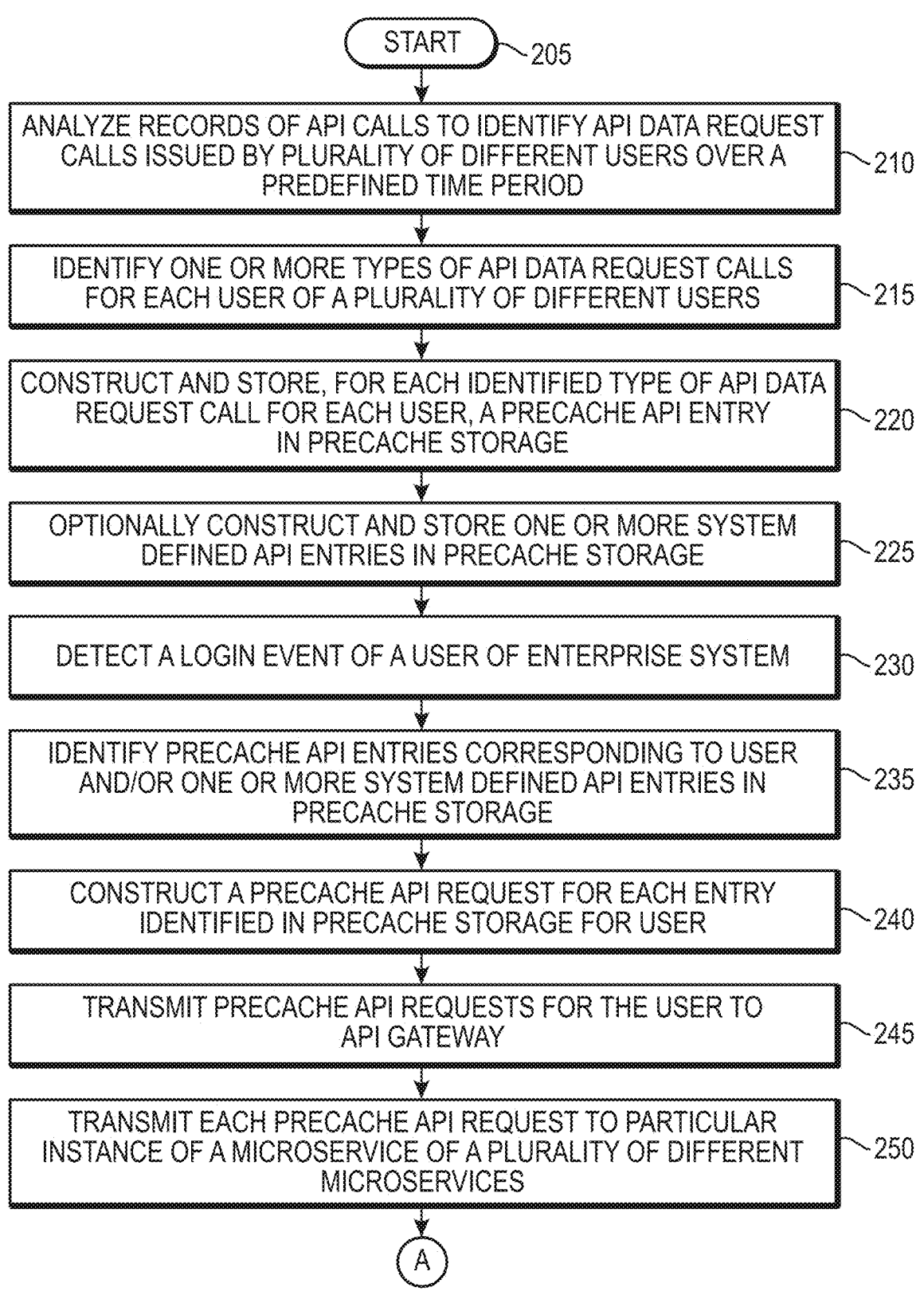
FIGS. 2A and 2B are a flow diagram of a sequence of steps for predicting data for precaching at a computer cache of a computer environment according to the one or more embodiments as described herein.
Figure 2B:
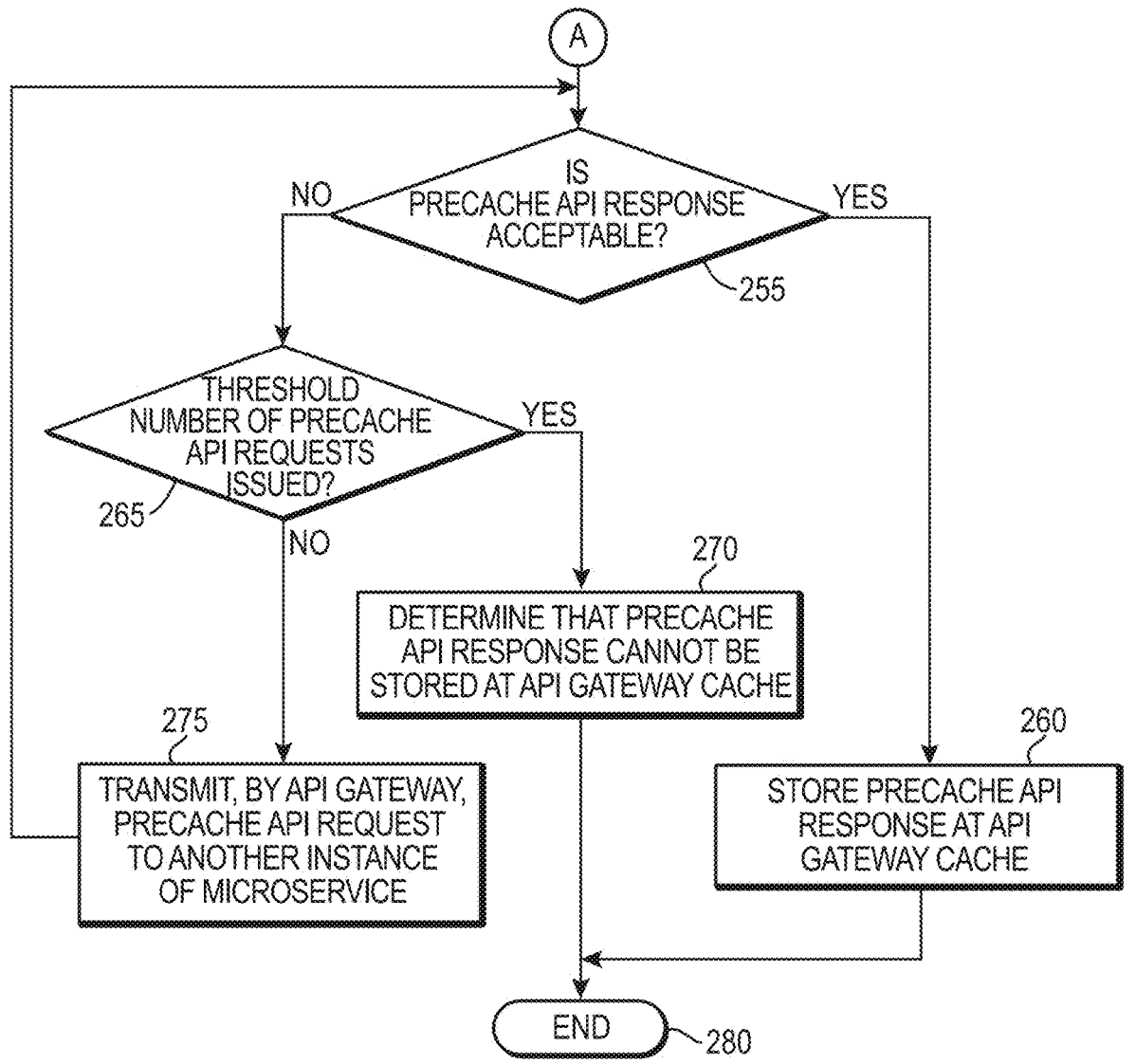

FIGS. 2A and 2B are a flow diagram of a sequence of steps for predicting data for precaching at a computer cache of a computer environment according to the one or more embodiments as described herein. As will be described in further detail below, data for precaching at API gateway cache 107 can be predicted for a user based on identifying one or more types of API calls that were most utilized by the user over a predefined time period. Additionally, one or more system defined API responses, corresponding to one or more system defined API calls, may be precached at API gateway cache 107 for a particular type of users or for all users that access the enterprise side 104 over a designated time window.

Although the examples in relation to FIGS. 2A and 2B may refer to precaching data for a single user, it is expressly contemplated that the one or more embodiments as described herein can precache API responses, in parallel or series, for a plurality of different users.

The procedure starts at step 205 and continues to step 210 in FIG. 2A. At step 210, cache module 116 analyzes API records to identify API data request calls issued by a plurality of different users over the predefined time period. As an example, let it be assumed that the predefined time period is the past 24 hours. Therefore, and in this example, the plurality of API records would correspond to the API calls made over the past 24 hours by a plurality of different users. For example, each of the plurality of different users may use client side application 125 executing on client device 112 to issue API calls to enterprise side 104 over a 24 hour period. The API calls may be received by API gateway 106 that may act as a single entry point to enterprise side 104.

As known by those skilled in the art, API gateway 106 may generate logs for the API calls. The logs, i.e., records, may contain information such as, but not limited to, a timestamp of the API call, a user identifier (ID) (i.e., customer ID), request meta-information, and/or response meta-information. The request meta-information may include an API uniform resource ID that identifies the endpoint or resource, which may be a particular microservice 100. Additionally, the request meta-information may also include the HTTP method used (GET, POST, DELETE, PUT, etc.) for the API call.

The response meta-information may include a response status code that indicates the status of the API call made by the client device 112 operated by the user. For example, a status code of 2xx may indicate that the API call was successfully received, understood and accepted, where xx may be any two integer values. A status code of 4xx may indicate a client error and that the API call is syntactically incorrect or the API call cannot be fulfilled because of a client-side issue. A status code of 5xx may indicate a server error and that the server failed to fulfill a valid API call due to an error on the server side, i.e., on the enterprise side 104.

The GET HTTP method is a type of HTTP method that is used to request data from a specific source, such as a microservice 110. Therefore, the cache module 116 may analyze all API records generated over the past 24 hours to identify those records that indicate that the GET HTTP method was used for the API call, i.e., the API call was an API data request call. As will be described in further detail below, these identified API records may be used to construct precache API requests that can be used to store API responses at gateway cache 107. Although reference is made to the GET HTTP method, it is expressly contemplated that the one or more embodiments as described herein are applicable to other types of HTTP methods (e.g., HEAD, OPTIONS) for data requests.

As an example, let it be assumed that the API records generated by API gateway 106 over the past 24 hours includes 20 records with a user ID corresponding to John Doe. Of those 20 records, let it be assumed that 15 indicate that the HTTP method used was GET, while the other 5 records indicate that some other HTTP method (e.g., DELETE, POST, etc.) was used.

Therefore, and based on the analysis, the cache module 116 identifies 15 records for John Doe that correspond to API data request calls. That is, and based on the analysis of all the API records generated over the past 24 hours by the API gateway 106, the cache module 116 determines that John Doe made 15 API data request calls. As will be described in further detail below, the information from the 15 API records corresponding to the 15 different API data request calls can be used to construct precache API requests for John Doe that are used to store corresponding precache API response at API gateway cache 107. The cache module 116 may perform a similar analysis of the API records generated by the API gateway 106 over the past 24 hours to identify the API data request calls for other users.

The procedure continues from step 210 to step 215. At step 215, the cache module 116 identifies one or more types of API data request calls for each of the plurality of different users.

Continuing with the example, the cache module 116 may analyze the 15 different records corresponding to the API data request calls made by John Doe over the past 24 hours. Specifically, the cache module 116 may identify the API uniform resource IDs in the 15 records. The cache module 116 may then compare the API uniform resource IDs to determine which types of API data request calls John Doe used most often over the past 24 hours.

For example, let it be assumed that the API uniform resource IDs in 8 of the 15 records indicate that John Doe requested account balance information for his checking account. Further, let it be assumed that the API uniform resource IDs in 4 other records, of the 15 records, indicates that John Doe requested beneficiary information. Moreover, let it be assumed that 2 other records indicate that John Doe requested interest rate information, and 1 other record indicates that John Doe requested advisor contact information.

In an embodiment, the cache module 116 may identify one or more types of API data request calls that are determined to be the top X types of API data request calls utilized by the user. In an embodiment, X is 6. However, for the example used herein and for simplicity, let it be assumed that X is 2. As such, and in this example, the two types of API data request calls most often used by John Doe over the past 24 hours are requests for account balance information and beneficiary information. The cache module 116 would select the top two types of API data request calls most often utilized by each other user over the predefined time period in a similar manner.

The procedure continues to step 220. At step 220, the cache module 116 constructs and stores, for each identified type of API data request call for each user, a precache API entry in precache storage 117. Continuing with the example, the cache module 116 constructs, i.e., generates, a precache API entry corresponding to John Doe's API data request calls for account balance information. Additionally, the cache module 116 constructs a precache API entry corresponding to John Doe's API data request calls for beneficiary information. The cache module 116 would construct a precache API entry for each of the identified types of API data request calls for each other user. The cache module 116 may transmit each of the constructed precache API entries to precache storage 117 for storage.

FIGS. 3A and 3B are example precache API entries that are constructed from API data request calls corresponding to a user according to the one or more embodiments as described herein. Precache API entry 300A is constructed by cache module 116 based on the API data request calls for account balance information by John Doe. Precache API entry 300B is constructed by cache module 116 based on the API data request calls for beneficiary information by John Doe. As will be described in further detail below, precache API entries 300A and 300B can be used to construct and store precache API requests in API gateway cache 107 based on a login event from John Doe.

As depicted in FIGS. 3A and 3B, precache API entries 300A and 300B each include a precache storage ID field that stores a unique ID for the constructed precache API entry that is maintained in precache storage 117. The precache storage ID of a precache API entry may differentiate the precache API entry from the other precache API entries that are stored in precache storage 117.

Each of precache API entries 300A and 300B also include a user ID field that identifies a user that corresponds to the constructed precache API entry. In this example, the two precache entries 300A and 300B are generated based on the top two types of API data request calls from John Doe. As such, the user ID field of precache API request entries 300A and 300B stores an ID for John Doe.

Each of precache API entries 300A and 300B includes an API uniform resource ID field that stores an ID for the API data request call corresponding to the precache API entry. In this example, cache module 116 constructs precache API entry 300A based on the account balance API data request calls from John Doe. Accordingly, the API uniform resource ID field of API entry 300A stores the API uniform resource ID corresponding to, for example, a microservice 110 that maintains the account balance information. Similarly, cache module 116 constructs precache API entry 300B based on beneficiary information API data request calls from John Doe. Accordingly, the API uniform resource ID field of API entry 300B includes the API uniform resource ID corresponding to, for example, a microservice 110 that maintains the beneficiary information. As mentioned above, each API data request call corresponds to the GET HTTP method. As such, API method fields of precache API entries 300A and 300B may store GET.

Each of precache API entries 300A and 300B may include a resession field and a resession counts field. The resession field may indicate whether the type of API data request calls were made during a single or multiple actives sessions by the user. In this example, there were 8 account balance API data request calls by John Doe. Let it be assumed that John Doe made these 8 different account balance API data request calls during three different active sessions (e.g., three different login events). As such, precache API entry 300A includes an ID of Y in the resession field since John Doe made the 8 different account balance API data request calls during multiple active sessions. Further, precache API entry 300A includes a value of 3 in the resession count field since the 8 different account balance API data request calls were made during 3 different active sessions.

In this example, there were 4 beneficiary information API data request calls by John Doe. Let it be assumed that John Doe made these 4 different account balance API data request calls during a single active session (e.g., after one login event). As such, precache API entry 300B includes an ID of N in the resession field since John Doe made the 4 different account balance API data request calls during a single active session. Further, precache API entry 300B includes a value of 0 in the resession count field since the 4 different beneficiary information API data request calls were made during a single active session.

Each of precache API entries 300A and 300B may include a priority field. The priority field may store a value that indicates a priority of the precache API entry in relation to the other precache API entries. In an embodiment, the priority may be a value within a range of two numbers, inclusive of the two numbers. For example, the range may be 1 to 5, where 1 is a highest priority and 5 is the lowest priority.

The cache module 116 may utilize any of a variety of different algorithms to determine a priority value for a precache API entry. For example, the cache module 116 may determine that a particular type of API data request call, e.g., account balance information, corresponding to a precache API entry always receives a priority of 1. Alternatively, the cache module 116 may determine that a precache API entry always receives a priority of 1 if the resession field of the precache API entry includes an ID of Y. Moreover, the cache module 116 may determine that precache API entries get different priority values based on the number of resession counts corresponding to the precache API entry. In the example of FIGS. 3A and 3B, precache API entry 300A and precache API entry 300B get priority values of 1 and 2, respectively. As will be described in further detail below in relation to flow diagram f FIG. 6, the priority field of precache API entries 300A and 300B may be utilized for recaching.

Referring back to FIG. 2, the procedure continues from step 220 to step 225. At step 225, the cache module 116 optionally constructs and stores one or more system defined API entries in the precache storage 117. In an embodiment, the one or more system defined API entries may be preconfigured by one or more affiliates, e.g., employees, of the enterprise. For example, the one or more system defined APIs may correspond to a marketing campaign by the enterprise and/or may be based on categories of different users/customers. For example, a marketing campaign requesting that users use e-delivery of financial statements instead of paper delivery may be directed to users that are of a particular age group, users that utilize particular services more often than other users, and/or other characteristics corresponding to users and/or any other factors. Alternatively, the one or more system defined API entries may be directed to all users/customers of the enterprise.

FIG. 3C is an example of a system defined API entry that is constructed for users according to the one or more embodiments as described herein. The system defined API entry 300C of FIG. 3C includes similar fields to that of the precache API entries 300A and 300B of FIGS. 3A and 3B. However, the values of the fields may correspond to a system defined API. For example, the user ID field of system defined API entry 300C indicates that all users are to receive the marketing campaign for e-delivery that is identified in the API uniform resource identifier field. Further, because the system defined API entry 300C is not based on the historical session of a single user, the resession field and resession counts field do not store values. The value of the priority field of system defined API entry 300C may be determined using any of a variety of different algorithms. For example, a particular type of system defined API entry may get a higher priority than other different system defined API entries. Although the example of FIG. 3C only includes a single system defined API entry, it is expressly contemplated that any number of system defined API entries may be stored in precache storage 117. As will be described in further detail below, the priority field of system defined API entry may be utilized for recaching.

Referring back to FIG. 2, the procedure continues from step 225 to step 230. At step 230, the cache module determines that a login event has occurred for a user of the enterprise system. In an embodiment, when the user logs into the enterprise side 104 using, for example, a username and password, an internal domain event may be triggered and the cache module 116 may receive an indication of the login event. In an embodiment, the cache module 116 may receive the indication of the login event from API gateway 106. In an embodiment, the indication of the login event received at the cache module 116 may include a user ID of the user that logged into the enterprise side 104 and other user related information. For example, the other user related information may be profile information that includes user specific (e.g., personal identifiable information) information corresponding to the user. For this example, let it be assumed that John Doe logs into enterprise side 104, using his credentials, after the precache storage 117 is populated with precache API entries 300A and 300B and system defined API entry 300C.

The procedure continues from step 230 to step 235. At step 235, the cache module 116 identifies precache API entries corresponding to the user and/or one or more system defined API entries. Specifically, the cache module 116 may access and search precache storage 117 using the user ID of John Doe that is received by the cache module 116 based on the login event of John Doe. The cache module 116 may then identify the precache API entries in precache storage 117 that correspond to John Doe. Additionally, the cache module 116 may also identify the system defined API entries in precache storage 117 that are applicable to John Doe.

In this example, the cache module 116 compares the user ID, which is received based on the login event from John Doe, with the user ID stored in the user ID field of each of the entries stored in precache storage 117. The cache module 116 may identify those entries in precache storage 117 when the comparison results in a match. In this example, and based on the comparison, the cache module 116 identifies precache API entries 300A and 300B in precache storage 117 that correspond to John Doe.

Additionally, and because system defined API entry 300C in precache storage 117 indicates all users, the cache module 116 also identifies system defined API entry 300C for John Doe. Therefore, for this example, let it be assumed that precache storage 117 stores a plurality of different entries for 1,000 different users. In the example, the cache module 116 would identify, from all the entries for the 1,000 different users, precache API entries 300A and 300B and system defined API entry 300C for John Doe. In an embodiment, the entries that are stored in precache storage 117 may be referred to as API calls that are marked for precaching in API gateway cache 107.

The procedure continues from step 235 to step 240. At step 240, the cache module 116 constructs, i.e., generates, a precache API request for each entry identified in precache storage 117 for the user. In an embodiment, the constructed precache API request includes a header. The header may include information from the corresponding API entry from the precache storage 117. For example, the header may comprise information that includes, but is not limited to, the user ID, the HTTP method used, an access protocol (e.g., HTTP) used to obtain the data related to the entry, a content type, a bearer token, etc.

In an embodiment, the constructed precache API request may also include an API uniform resource ID from the corresponding API entry from the precache storage 117. Even more, the constructed precache API request may include a recache value that indicates whether recaching will occur and the frequency of recaching. As will be described in further detail below, recaching may occur so that more-up-to-date precache API responses are stored in API gateway 107.

FIG. 4 are examples of precache API requests that are constructed for precache API entries 300A and 300B and system defined API entry 300C according to the one or more embodiments as described herein. Precache API request 401A may be constructed by cache module 116 for precache API entry 300A. Precache API request 401B may be constructed by cache module 116 for precache API entry 300B. Precache API request 401C may be constructed by cache module 116 for system defined API 300C.

Each of precache API requests 401A through 401C include an API uniform resource ID from the corresponding entry. Further, each of precache API requests 401A through 401C includes a constructed header with relevant information, e.g., user ID of John Doe, from the corresponding entry. Moreover, each of precache API request 401A through 401C includes a value for recaching.

In an embodiment, the recache value may be determined by the cache module 116 in any of a variety of different ways and using any of a variety of different algorithms. The recache value may be within two range values inclusive of the range values. For example, the recache range may be between 0 and 5 inclusive of 0 and 5. A value of 5 may indicate that the precache API response corresponding to the constructed precache API request should be recached 5 times. A value of 0 may indicate that the precache API response corresponding to the constructed precache API request should not be recached.

In an embodiment, the cache module 116 may utilize the priority value and/or the resession count value in the identified entry from precache storage 117 corresponding to the user to determine the recache frequency. For example, the cache module 116 may utilize the priority value of 1 from precache API entry 300A to determine that the precache API response, which corresponds to the precache API request 401A constructed for precache API entry 300A, should be recached a maximum number of times, e.g., 5 times, as depicted in FIG. 4. As depicted in FIG. 4, precache API request 401B, which is constructed for precache API entry 300B, includes a recache value of 0. Further, precache API request 401C, which is constructed for system defined API entry 300C, includes a recache value of 3. As will be described in further detail below in relation to the flow diagram of FIG. 6, the recache values can be utilized for recaching precache API responses at API gateway cache 107.

Referring back to FIG. 2, the procedure continues from step 240 to step 245. At step 245, the cache module 116 transmits each of the precache API requests, constructed for the user that logged in (e.g., John Doe) as described in relation to step 230, to the API gateway 107. In this example, the cache module 116 transmits precache API requests 401A, 401B, and 401C that are constructed for John Doe to API gateway cache 107.

The procedure continues from 245 to step 250. At step 250, each precache API request, transmitted to API gateway cache 107, is transmitted to a particular instance of a microservice of a plurality of different microservices. In this example, each of precache API requests 401A through 401C, which are constructed for John Doe based on his login event and identifying entries 300A through 300C in precache storage 117, are transmitted to particular microservices 110 in FIG. 1. For this example, let it be assumed that microservice A is the microservice utilized to obtain account balance information. The API gateway 106 may transmit the precache API request 401A to an instance of microservice A to obtain the account balance information for John Doe. In an embodiment, the particular instance of microservice A is random and cannot be predetermined. Alternatively, the particular instance of microservice A can be selected and predetermined. For this example, let it be assumed that API gateway 106 transmits API gateway request 401A to instance 1 of microservice A 110A.

The API uniform resource ID of precache API request 401A may identify microservice A. Moreover, the user ID of John Doe in the header of precache API request 401A may be utilized to ensure that the account balance information is only obtained for John Doe and not for all other users. Utilization of the user ID to limit the account balance information to that of John Doe is critical to conserve cache space in API gateway cache 117. Based on issuing the precache API request 401A, the API gateway 106 may obtain a precache API response from instance 1 of microservice A 110A. The precache API response may include the requested data, e.g., account balance information, and other information, e.g., status code. For this example, a precache API response may also be received for precache API requests 401B and 401C that are transmitted to particular microservices 110.

The procedure continues from step 250 to step 255 of FIG. 2B. At step 255, the API gateway 106 determines if each of the received precache API responses is acceptable or unacceptable. Continuing with the Example of John Doe, the API gateway determines if the three precache API responses that are received based on precache API requests 401A through 401C are acceptable. In an embodiment, the API gateway determines if a precache API response is acceptable or unacceptable based on a status code included in the precache API response. For example, if the precache API response includes a status code of 2XX, the API gateway 106 may determine that the precache API response is acceptable. If the precache API response includes a status code of 4XX or 5XX, the API gateway 106 may determine that the precache API response is unacceptable. For this example, let it be assumed that the precache API response for beneficiary information for John Doe based on precache API request 401B is acceptable. Further, let it be assumed that the precache API response for the e-delivery marketing campaign based on precache API request 401C is also acceptable. However, let it be assumed that the precache API response for John Doe's account balance information is unacceptable.

If a precache API response is acceptable at step 255, the procedure continues to step 260. At step 260, the acceptable precache API response is stored at API gateway 107. Continuing with the example of John Doe, the precache API response based on precache API request 401B is acceptable. Therefore, the precache API response, which includes John Doe's beneficiary information, is stored at API gateway cache 107. Further, the precache API response based on precache API request 401C is also acceptable. Therefore, the precache API response, which includes the e-delivery marketing campaign information, is stored at API gateway cache 107.

As will be described in further detail below in relation to the flow diagram of FIG. 5, a precached API response stored in API gateway cache 107 may be transmitted to a client device operated by John Doe when the API gateway 106 receives an API call that includes information that substantially matches a cache key that corresponds to precache API requests 401B or 401C. The procedure continues from step 260 to step 280 where the procedure ends.

If a precache API response is unacceptable at step 255, the procedure continues to step 265. At step 265, the API gateway 106 determines if a threshold number of precache API requests has been issued. Let it be assumed that the threshold number of precache API requests is 5. If the threshold number of precache API requests has been issued, the procedure continues from step 265 to step 270. At step 270, the API gateway 106 determines that the precache API response cannot be stored at API gateway cache 107. The procedure continues from step 270 to step 280 and the procedure ends.

In this example, the precache API request 401A has only been issued once. As such, the threshold number of precache API requests (5) has not been issued and the procedure would continue from step 265 to step 275. At step 275, the API gateway 106 transmits another precache API request to another instance of the microservice. Therefore, and in this example, the API gateway sends the precache API request 401A to a different instance of microservice A for John Doe's account balance information. For this example, let it be assumed that the API gateway 106 transmits the precache API request 402A to instance N of microservice A 110B. The procedure then reverts back to step 255 to determine if the new precache API response, corresponding to retransmitted precache API request 402A, is acceptable or unacceptable. Therefore, the precache API request 402A is repeatedly transmitted to different instances of microservice A until (1) an acceptable new precache API response is received at step 255 such that the new precache API response can be stored at the API gateway cache 107, or (2) a threshold number of precache API requests are issued such that a determination is made at step 265 that a precache API response, which corresponds to precache API request 402A, cannot be cached at API gateway 107.

Figure 5:
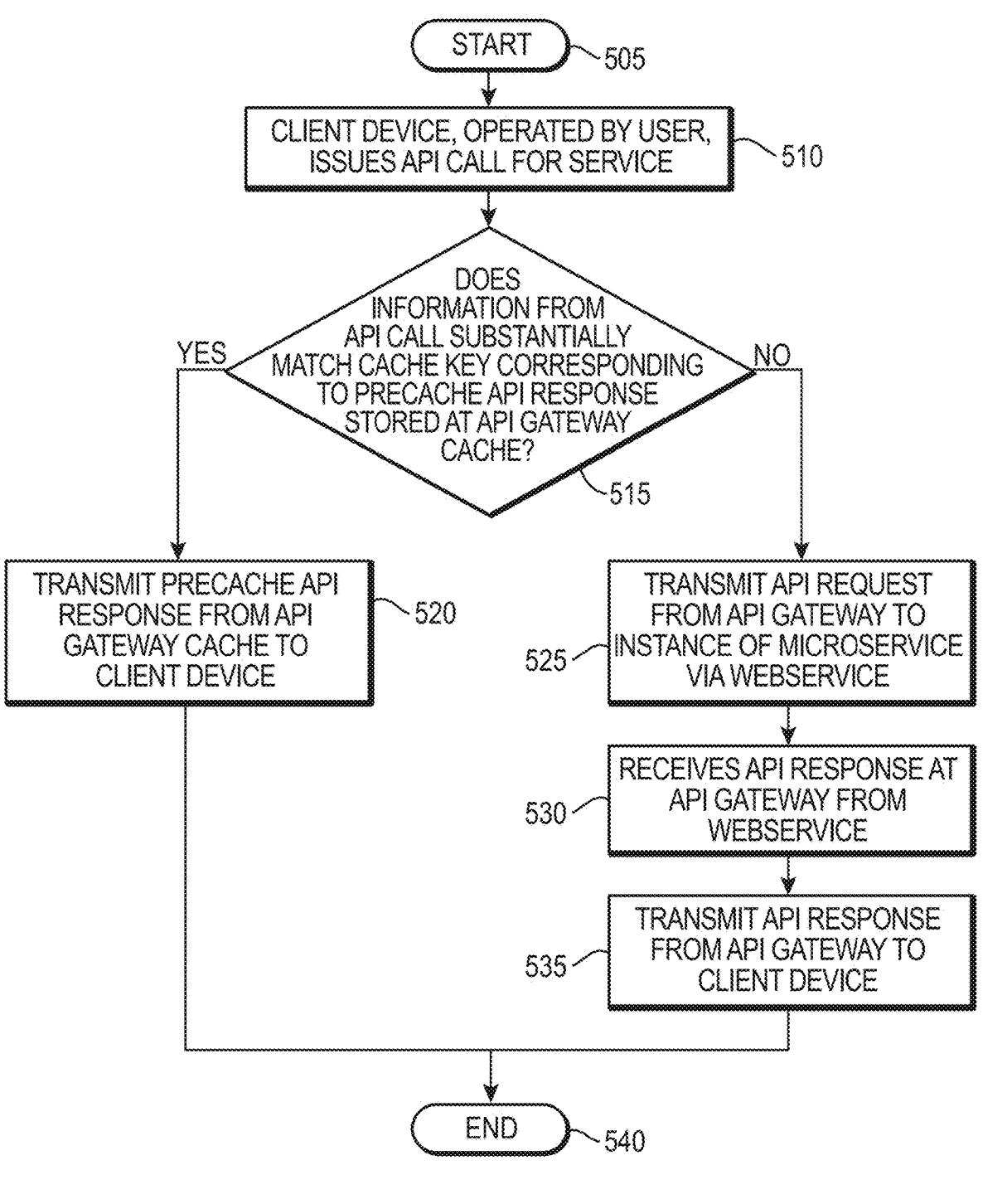
FIG. 5 is a flow diagram of a sequence of steps for using API gateway cache that is updated according to the one or more embodiments as described herein.

FIG. 5 is a flow diagram of a sequence of steps for using API gateway cache 107 that is updated according to the one or more embodiments as described herein. The procedure of FIG. 5 starts at step 505 and continues to step 510. At step 510, client device 112, operated by a user, issues an API call for a service. For this example, let it be assumed that John Doe utilizes client device 112 to issue an API call requesting account balance information for his checking account. The API call requesting the account balance information may be received at API gateway 106.

The procedure continues to step 515. At step 515, the API gateway 106 determines if information from the API call substantially matches a cache key corresponding to a precache Api response stored in API gateway cache 107. For example, the cache key may be generated based on (1) an API uniform resource ID, (2) a user ID or a header including the User ID, and (2) the HTTP method used. Therefore, the API gateway 106 may compare the user ID, API uniform resource ID, and HTTP method used from the API call with the corresponding information of the cache key. For this example, the API gateway 106 determines that the information from the API call substantially matches the cache key for the API response stored in API gateway cache that corresponds to precache API request 402A.

Based on the substantial match at step 515, the procedure continues to step 520. At step 520, the API gateway 106 transmits the precache API response from API gateway cache 107 to the client device 112. In this example, the API gateway 106 transmits the precache API response, which corresponds to precache API request 402A, from API gateway cache 107 to client device 112 operated by John Doe. The procedure then ends at step 540.

Therefore, the client device 112 operated by John Doe can obtain the precache API response for his account balance information from the API gateway cache 107 instead of having to query the microservice 110 via webservice 108. As a result, problematic data, e.g., stale or no data, is less likely to be provided to client device 112 which is a problem encountered by conventional systems and techniques that do not cache API responses in the manner described herein. Specifically, and with conventional systems and techniques, John Doe's account balance information would have to be obtained from microservice 110 via webservice 108. Obtaining this information from the microservice 110 introduces latency experienced by the client device 112 in receiving the requested information. The introduced latency, which is encountered by conventional systems and techniques, can result in problematic data being provided to the client device 112 when requested.

In contrast, the one or more embodiments as described herein overcome this deficiency by caching API responses in the manner described herein such that up-to-date data, instead of problematic data, is provided to client device 112 based on a request. Specifically, the one or more embodiments as described herein mitigate the latency experienced by conventional systems and techniques by predicting which API responses to precache for a user by identifying the API calls that were most utilized by the user over a predefined time period. Accordingly, the one or more embodiments as described herein provide an improvement in the existing technological field of cache computing.

Returning to step 510, let it be assumed that the client device 112 operated by John Doe issued an API call for mortgage rate information. Further, let it be assumed that at step 515 the API gateway 106 determines that the information from API call for mortgage rate information does not substantially match a cache key of API gateway cache 107.

Therefore, the procedure continues from step 515 to step 525. At step 525, API gateway 106 transmits an API request to an instance of a microservice 110 via a webservice 108. In this example, because the precache API response is not stored in API gateway 107 cache for the mortgage rate information, the API gateway 106 needs to obtain the mortgage rate information for John Doe form the microservice that offers this service. As such, API gateway 106 uses the API uniform resource ID along with the user ID for John Doe from the API call to issue an API request for the mortgage rate information from an instance that executes a microservice. In an embodiment, the API gateway 106 may issue multiple requests to different instances as described above in relation to FIG. 2.

The procedure continues to step 530 and the API gateway 106 receives the API response from the instance executing the microservice 110 via webservice 108. The procedure continues to step 535 and the API gateway 106 transmits the API response, which is received from the microservice 110, to the client device 112 operated by John Doe. The procedure then ends at step 540.

Figure 6:
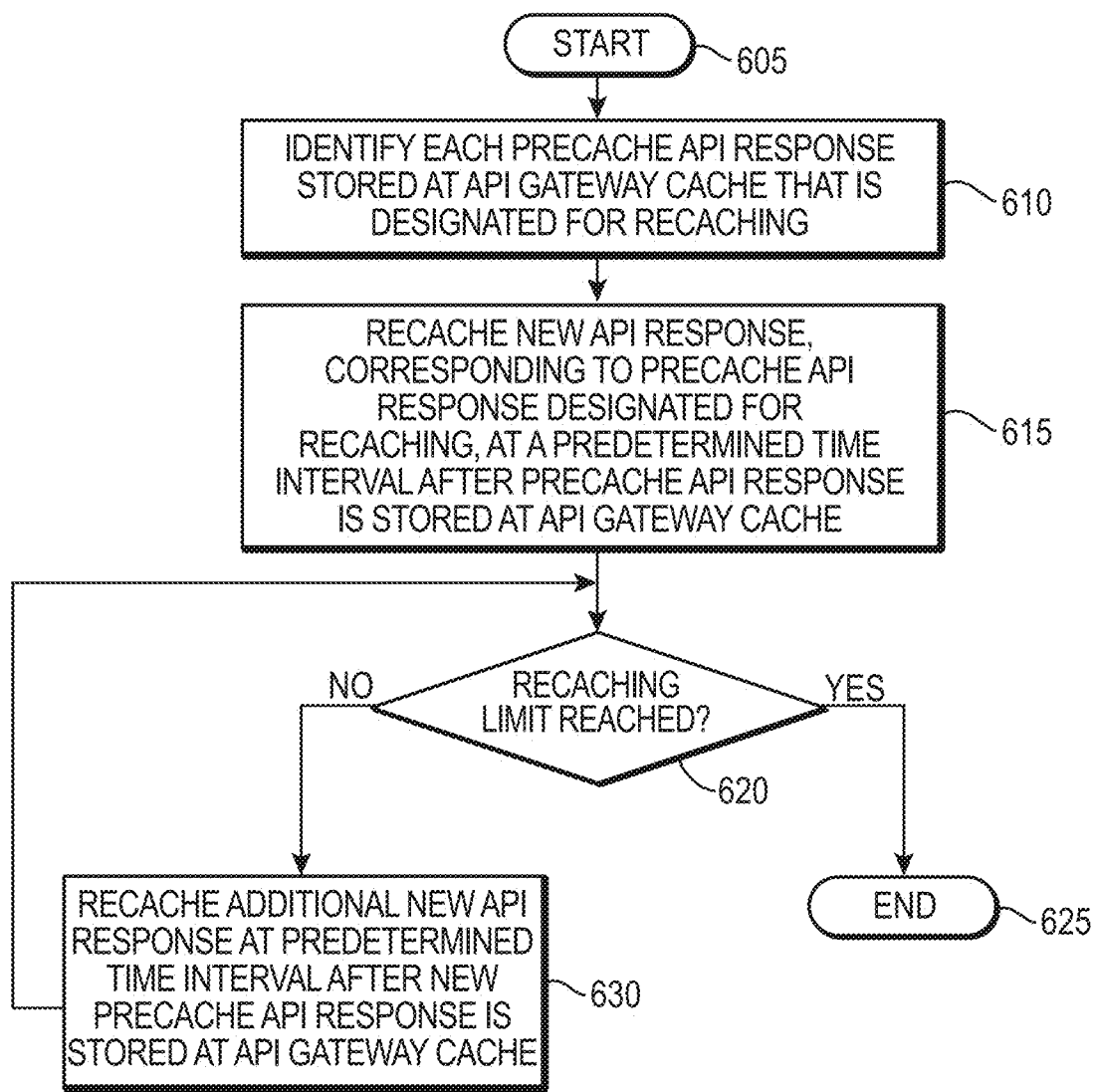
FIG. 6 is a flow diagram of a sequence of steps for recaching at API gateway cache according to the one or more embodiments as described herein.

FIG. 6 is a flow diagram of a sequence of steps for recaching at API gateway cache 107 according to the one or more embodiments as described herein. The procedure of FIG. 6 starts at step 605 and continues to step 610. At step 610, the precache API requests, corresponding to the precache API response stored at API gateway cache 107, are analyzed to identify which precache API response are designated for recaching. In an embodiment, the API gateway 106 may analyze the recache value in each precache API request to determine if the corresponding precache API response is designated for recaching.

For example, if the recache value in a precache API request includes a value of 0, the API gateway 106 may determine that the corresponding precache API response stored at API gateway cache 107 is not designated for recaching. If the recache value in a precache API request includes a value of 1 to 5, the API gateway 106 may determine that the corresponding precache API response stored at API gateway cache 107 is designated for recaching. In an embodiment, the recache value of 1 to 5 may indicate a frequency of recaching as will be described in further detail below. For example, if the recache value is 1, the precache API response corresponding to the precache API request may be recached a single time. If the recache value is 5, the precache API response corresponding to the precache API request may be recached five times.

For the example in relation to FIG. 6, let it be assumed that precache API requests 401A-401C corresponds to the precache API responses that are stored in API gateway cache 107. The example in relation to FIG. 6 is for simplicity and ease of understanding. As such, it is expressly understood that API gateway 107 can, and likely will, store many more precache API responses that are designated for recaching under normal operating conditions. As such, the example in relation to FIG. 6 is for illustrative purposes only.

Returning to the example, the API gateway 106 determines that because precache API request 401B includes a recache value of 0, the precache API response (e.g., beneficiary information) stored at API gateway cache 107 is not designated for recaching. Because the precache API response for beneficiary information is not designated for recaching. The precache API response may be stored at API gateway cache 107 until the time-to-live period (e.g., 60 seconds) has expired, at which point the API response may be evicted from the API gateway cache.

However, the API gateway 106 determines because precache API requests 401A and 401C include recache values of 5 and 3, respectively, the precache API responses (e.g., account balance information and e-delivery) stored at API gateway cache 107 are designated for recaching. Therefore, and as will be described in further detail below, the precache API response for John Doe's account balance information is recached 5 times while the precache API response for the e-delivery marketing campaign is recached 3 times.

The procedure continues from step 610 to step 615. At step 615, the precache API responses, which are designated at recaching, are recached at a predefined time interval after the precache API response, which corresponds to the precache API request, is stored at API gateway cache 107. For this example, let it be assumed that the time-to-live for precache API response stored at API gateway cache 107 is 60 seconds and the predefined time interval is 5 seconds. Therefore, and after the precache API response for John Doe's account balance information is stored at API gateway cache 107, the API gateway 106 may trigger recaching at 55 seconds (60 second–5 seconds), e.g., 5 seconds after the precache API response is stored in API gateway cache 107. Similarly, the API gateway 106 would trigger recaching for the e-delivery marketing campaign 5 seconds after the precache API response for the e-delivery marketing campaign is stored at API gateway cache 107.

In an embodiment, the recaching of the precache API response (hereinafter new precache API response) may require the API gateway 106 to communicate with an instance of a microservice 110 as described in steps 250 through 270 on FIG. 2. When an acceptable new precache API response is received, the API gateway 106 may store the new precache API response at API gateway cache 107. Continuing with the example, the new precache API response for John Doe's account balance information is stored at API gateway cache 107. Further, the new precache API response for the e-delivery marketing campaign is stored at API gateway cache 107.

The procedure continues from step 615 to step 620. At step 620, it is determined whether the recaching limit has been reached. In an embodiment, the recaching limit may be determined based on the recache value of the precache API request corresponding to the precache API response(s) stored at API gateway cache 107. Continuing with the example, the new precache API response for John Doe's account balance information corresponds to precache API request 402A that has a recache value of 5. As such, the recache limit for John Doe's account balance information is 5. The recaching API response for the e-delivery marketing campaign corresponds to precache API request 402C that has a recache value of 3. As such, the recache limit for the e-delivery marketing campaign information is 3.

If the recaching limit is reached, the procedure continues from 620 to step 625 where the procedure ends. After the recaching limit is reached, the newest, i.e., latest, precache API response stored in API gateway cache 107 may be evicted after the time-to-live period has expired.

If the recaching limit is not reached, the procedure continues from step 620 to step 630. At step 630, the API response is again recached, in a similar manner as described above in relation to step 615, at the predefined interval after the new precache API response is stored at API gateway cache 107. For the example, the new precache API response for John Doe's account balance is stored at API gateway cache 107. As such, and 5 seconds after the storing, an additional new precache API response may be obtained as described above in relation to step 615. An additional new precache API response for the e-delivery marketing campaign may similarly be obtained and stored at API gateway cache 107.

The procedure then reverts back to step 620 and the procedure repeats until the recaching limit has been reached. Therefore, and in this example, John Doe's account balance information is recached five times, while the e-delivery marketing campaign information is recached three times. By recaching API responses as described in relation to FIG. 6, the one or more embodiments as described herein can iteratively store in API gateway cache 107 the most up-to-date data that corresponds to the users most utilized API calls. As such, the recaching according to the one or more embodiments as described herein reduces the likelihood that problematic data, e.g., stale data, will be provided to client devices 112 operated by users. Therefore, the recaching according to the one or more embodiments as described herein provide an improvement in the existing technological field of cache computing.

It should be understood that a wide variety of adaptations and modifications may be made to the techniques. For example, the steps of the flow diagrams as described herein may be performed sequentially, in parallel, or in one or more varied orders. Further, although reference may be made to the cache module 116 performing the precaching and recaching, it is expressly contemplated that a software module may perform the precaching and a different software module may perform the recaching.

In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer implemented method for managing a computer cache, the computer implemented method comprising:

identifying a unique user identifier corresponding to a user associated with a login request to an enterprise computing environment;

using the unique identifier to identify, from precache storage, an application program interface (API) entry corresponding to a previous user specific API call for a service associated with a function implemented by a microservice of a plurality of different microservices of the enterprise computing environment, wherein the previous user specific API call is a type of API data request call, of a plurality of different types of API data request calls, which is determined to be most utilized by the user over a predefined time period;

constructing from the API entry a precache API request for the type of API data request call, wherein the precache API request includes at least (1) a header including one or more of the unique user identifier and a bearer token and (2) API identifier information corresponding to the previous user specific API call;

receiving, by an API gateway, the precache API request;

issuing, by the API gateway, the precache API request to a first instance of the microservice;

receiving, at the API gateway, a precache API response from the first instance of the microservice;

determining if the precache API response includes one or more first values or one or more second values;

caching the precache API response at an API gateway cache when the precache API response includes the one or more first values;

in response to determining that the precache API response includes the one or more second values, automatically retriggering the precache API request, which is a retriggered precache API request, to a different instance of the microservice until (1) a new precache API response, corresponding to a particular retriggered precache API request directed to a particular different instance of the microservice, includes the one or more first values or (2) a threshold number of a plurality of precache API requests, which includes the precache API request and all of the retriggered precache API requests, has been issued; and when each new precache API response, from a corresponding different instance of the microservice, includes the one or more second values and the threshold number of the plurality of API requests have been issued to the different instances of the microservice:

determining that there is no caching of any of the new precache API responses at the API gateway cache for any of the retriggered precache API requests, and when a data request of the type of API data request call is received from a client device operated by the user, obtaining a microservice API response from the microservice and not from the API gateway cache.

2. The method of claim 1, further comprising:

caching a particular new precache API response at the API gateway cache when the particular new precache API response, from a particular different instance of the microservice, includes the one or more first values.

3. The computer implemented method of claim 1, further comprising:

receiving, at the API gateway and from the client device operated by the user, a user API data request;

determining whether information from the user API data request substantially matches a cache key corresponding to a stored precache API response in the API gateway cache;

in response to determining that the information from the user API data request substantially matches the cache key, transmitting the stored precache API response from the API gateway cache to the client device to fulfill the user API data request; and in response to determining that the information from the user API data request does not substantially match the cache key, (1) obtaining, at the API gateway, a different API response from a particular microservice and (2) transmitting, from the API gateway and to the client device, the different API response to fulfill the user API data request.

4. The computer implemented method of claim 1, accessing a plurality of API records generated by the API gateway, wherein each API record corresponds to a different API call directed to the enterprise system by one of a plurality of different users over a predefined time period, and wherein each API record includes one or more of a particular user identifier, request meta information, and response meta information;

constructing a particular API entry from a plurality of selected API records for the user that are a same type of API call of a plurality of different API calls; and storing the particular API entry for the user in the precache storage.

5. The computer implemented method of claim 4, wherein the particular API entry includes one or more of (1) a particular priority value, (2) a particular method type, and (3) a particular resession count value.

6. The computer implemented method of claim 1, wherein the precache API request includes a uniform resource identifier (URI) that identifies the microservice of the plurality of different microservices.

7. The computer implemented method of claim 1, further comprising:

determining that a particular precache API request includes a recache value designating a particular precache API response, corresponding to the particular precache API request, for recaching;

waiting a predetermined amount of time after the particular precache API response is stored at the API gateway cache;

issuing, after waiting the predetermined amount of time, the particular precache API request to a particular instance of a particular microservice; and receiving an updated precache API response from the particular microservice;

storing the updated precache API response at the API gateway cache, wherein the updated precache API response takes the place of the particular precache API response in the API gateway cache.

8. A system for managing and operating a computer cache, the system comprising:

a memory; and a processor coupled to the memory, the processor executing a software module configured to:

identify a unique user identifier corresponding to a user associated with a login request to an enterprise computing environment;

use the unique identifier to identify, from precache storage, an application program interface (API) entry corresponding to a previous user specific API call for a service associated with a function implemented by a microservice of a plurality of different microservices of the enterprise computing environment, wherein the previous user specific API call is a type of API data request call, of a plurality of different types of API data request calls, which is determined to be most utilized by the user over a predefined time period, and wherein the API entry for only the type of API request call determined to be most utilized is included in the precache storage;

construct from the API entry a precache API request for the type of API data request call, wherein the precache API request includes at least (1) a header including one or more of the unique user identifier and a bearer token and (2) API identifier information corresponding to the previous user specific API call;

an API gateway configured to:

receive the precache API request;

issue the precache API request to a first instance of the microservice;

receive a precache API response from the first instance of the microservice;

cache, at an API gateway cache, the precache API response when the precache API response includes one or more first values;

in response to determining that the precache API response includes one or more second values, automatically retrigger the precache API request, which is a retriggered API request, to a different instance of the microservice until (1) a new precache API response, corresponding to a particular retriggered precache API request directed to a particular different instance of the microservice, includes the one or more first values or (2) a threshold number of a plurality of precache API requests has been issued; and when (1) a data request of the type of API data request call is received from a client device operated by the user and (2) each new precache API response, from a corresponding different instance of the microservice, includes the one or more second values and the threshold number of the plurality of API requests have been issued to the different instances of the microservice, obtain a microservice API response from the microservice and determine that there is no caching of any of the new precache API response at the API gateway cache for any of the retriggered precache API requests.

9. The system of claim 8, wherein the API gateway is further configured to:

cache a particular new precache API response at the API gateway cache when the particular new precache API response, from a particular different instance of the microservice, includes the one or more first values.

10. The system of claim 8, wherein the API gateway is further configured to:

receive, from the client device operated by the user, a user API data request;

determine whether information from the user API data request substantially matches a cache key corresponding to a stored precache API response in the API gateway cache;

in response to determining that the information from the user API data request substantially matches the cache key, transmit the stored precache API response from the API gateway cache to the client device to fulfill the user API data request; and in response to determining that the information from the user API data request does not substantially match the cache key, (1) obtain a different API response from a particular microservice and (2) transmit from the API gateway and to the client device the different API response to fulfill the user API data request.

11. The system of claim 8, wherein the software module further configured to:

access a plurality of API records generated by the API gateway, wherein each API record corresponds to a different API call directed to the enterprise system by one of a plurality of different users over a predefined time period, and wherein each API record includes one or more of a particular user identifier, request meta information, and response meta information; and construct a particular API entry from a plurality of selected API records for the user that are a same type of API call of a plurality of different API calls.

12. The system of claim 11, wherein the particular API entry includes one or more of (1) a particular priority value, (2) a particular method type, and (3) a particular resession count value.

13. The system of claim 8, wherein the precache API request includes a uniform resource identifier (URI) that identifies the microservice of the plurality of different microservices.

14. The system of claim 8, wherein the API gateway is further configured to:

determine that a particular precache API request includes a recache value designating a particular precache API response, corresponding to the particular precache API request, for recaching;

wait a predetermined amount of time after the particular precache API response is stored at the API gateway cache;

issue, after waiting the predetermined amount of time, the particular precache API request to a particular instance of a particular microservice;

receive an updated precache API response from the particular microservice; and store the updated precache API response at the API gateway cache, wherein the updated precache API response takes the place of the particular precache API response in the API gateway cache.

\* \* \* \* \*